(12) United States Patent
Kronenbitter et al.

(10) Patent No.: US 12,298,742 B2
(45) Date of Patent: May 13, 2025

(54) METHOD AND DEVICE USING ALTERNATIVE CALCULATION METHODS FOR DETERMINING AN OPTIMIZED PROCESS CONFIGURATION FOR MANUFACTURING OR PROCESSING PRODUCTS

(71) Applicant: FACTORYPAL GMBH, Berlin (DE)

(72) Inventors: Bastian Tiemo Kronenbitter, Bruchsal (DE); Edith Chorev Metger, Berlin (DE); David Breyel, Bad Schoenborn (DE)

(73) Assignee: FACTORYPAL GMBH, Berlin (DE)

( * ) Notice: Subject to any disclaimer, the term of this patent is extended or adjusted under 35 U.S.C. 154(b) by 478 days.

(21) Appl. No.: 17/675,357

(22) Filed: Feb. 18, 2022

(65) Prior Publication Data

US 2022/0269248 A1     Aug. 25, 2022

(30) Foreign Application Priority Data

Feb. 19, 2021   (EP) .................................... 21158040

(51) Int. Cl.
    *G05B 19/418*       (2006.01)
    *G05B 23/02*        (2006.01)
(52) U.S. Cl.
    CPC ..... *G05B 19/4183* (2013.01); *G05B 19/4188* (2013.01); *G05B 23/024* (2013.01); *G05B 23/0294* (2013.01)

(58) Field of Classification Search
None
See application file for complete search history.

(56) References Cited

U.S. PATENT DOCUMENTS

| 11,160,826 | B1 * | 11/2021 | Demorrow | ................ A61P 1/16 |
| 2005/0159922 | A1 | 7/2005 | Hsiung et al. | |
| 2006/0095484 | A1 | 5/2006 | Erramilli et al. | |
| 2006/0212140 | A1 * | 9/2006 | Brackney | ............ F02D 41/1467 123/568.21 |

(Continued)

OTHER PUBLICATIONS

Extended Search Report with machine translation for European Patent Application No. 21158040.2, dated Jul. 27, 2021, 12 pages.

*Primary Examiner* — Bernard G Lindsay
(74) *Attorney, Agent, or Firm* — Sheridan Ross P.C.

(57) ABSTRACT

A method for automatically determining an optimized process configuration of a process for manufacturing or processing products that can be executed using a technical system and can be configured using a number of different process configuration parameters comprises: determining a process configuration of the process that is optimized with regard to a defined metric and is defined by respective target values of process configuration parameters using an optimization method that is adapted to the process and is at least partially based on machine learning, using input data that include production data and features that are given by historical process configuration data and status data of the system or process or are derived therefrom; and outputting target process configuration data representing the determined optimized process configuration by means of the target values of the process configuration parameters.

17 Claims, 9 Drawing Sheets

(56) References Cited

U.S. PATENT DOCUMENTS

| | | | |
|---|---|---|---|
| 2013/0145219 A1* | 6/2013 | Dalal | G06F 11/0748 |
| | | | 714/47.1 |
| 2013/0211546 A1* | 8/2013 | Lawson | H04L 67/02 |
| | | | 700/9 |
| 2014/0250153 A1* | 9/2014 | Nixon | G06F 16/22 |
| | | | 707/812 |
| 2014/0282257 A1* | 9/2014 | Nixon | G05B 15/02 |
| | | | 715/835 |
| 2016/0337289 A1* | 11/2016 | Duca | H04L 12/1895 |
| 2017/0225447 A1* | 8/2017 | Varadan | B41F 17/00 |
| 2018/0157933 A1* | 6/2018 | Brauer | G06F 18/24143 |
| 2019/0093187 A1* | 3/2019 | Lee | G06N 3/08 |
| 2020/0110385 A1 | 4/2020 | Yu et al. | |
| 2021/0042570 A1* | 2/2021 | Iskandar | G06F 11/3075 |
| 2022/0342379 A1* | 10/2022 | Orhanen | G06N 3/045 |
| 2024/0144043 A1* | 5/2024 | Helterhoff | G05B 13/0265 |

* cited by examiner

| SP | PP1 (ML) | PP2 (ML) | PP3 (non-mL) | PP4 (non-mL) | PP5 (non-mL) |
|---|---|---|---|---|---|
| SP1 | 1 | 1 | 3 | 1 | 2 |
| SP2 | 2 | 0 | 3 | 1 | 0 |
| SP3 | 5 | 1 | 0 | 5 | 3 |
| SP4 | 1 | 2 | 2 | 3 | 4 |
| SP5 | 0 | 0 | 1 | 0 | 0 |
| SP6 | 2 | 1 | 3 | 5 | 5 |
| SP7 | 1 | 1 | 0 | 3 | 4 |
| K | 4 | 5 | 1 | 4 | 3 |

METHOD AND DEVICE USING ALTERNATIVE CALCULATION METHODS FOR DETERMINING AN OPTIMIZED PROCESS CONFIGURATION FOR MANUFACTURING OR PROCESSING PRODUCTS

CROSS-REFERENCE TO RELATED APPLICATION

This application claims the benefit of European Patent Application No. 21158040.2 filed Feb. 19, 2021, the entire contents of which are incorporated herein by reference in its entirety.

The present invention is in particular in the technical field of process automation and relates to a method, in particular a computer-implemented method, for automatically determining an optimized process configuration of a process for manufacturing or processing products, which is executable using a technical system and is configurable using various process configuration parameters. It furthermore relates to a plant control system that is configured to configure or control a process that can run on a technical system to execute manufacturing or processing products according to the method mentioned according to the optimized process configuration, and a computer program configured to carry out the method on the plant control system.

In the context of modern industrial production and processing (in particular finishing or testing) of products, very complex technical systems are often used, which in many cases are constructed from a number of individual or combined devices and processing stations (in particular machines) and on which one or more different complex manufacturing or working methods (processes), which can each be configured in many aspects, can accordingly run. Manufacturing lines (lines) for paper production or for manufacturing nonelectronic consumer-products or parts thereof, such as cosmetic products and the packaging material thereof, or processes for manufacturing chemical materials, in particular pharmaceutical products, are to be mentioned solely as some examples from the variety of options. In order to make it possible for a wide variety of products or product variants to be able to be manufactured or processed on the same system, such technical systems and thus also the processes running on them can usually be configured using a large number of different settable parameters.

With regard to such a process, these settable parameters for configuring the process are each individually or collectively referred to as "process configuration parameters" and their totality is also referred to as a "process configuration". As a rule, the process configuration parameters or the process configuration as a whole result from a corresponding system configuration of the system provided for executing the process by means of associated system configuration parameters. The process configuration parameters can thus regularly be assigned to one or more of the system configuration parameters or can be identical thereto, in particular within the scope of a function-type assignment.

With respect to the goal of the highest possible level of effectiveness and/or efficiency of such a process for manufacturing or processing products, it is regularly necessary to optimize the corresponding technical system or the process running thereon, which means in particular finding an optimized process configuration. On the one hand, this can be carried out statically in the sense of determining an optimized initial configuration that is maintained unchanged for the duration of the process. In many cases, however, there is the problem that various influencing variables on the process can change during its course, for example due to temperature fluctuations, signs of wear on the system, or time-dependent changes in the starting products. In such cases, dynamic optimization is therefore desirable, by means of which the value of the process course itself is used for repeated, in particular ongoing, process optimization by means of appropriate adaptation of the process configuration.

The known measures for production optimization include in particular the use of planning software in which an optimization of the production planning, in particular an efficiency maximum with regard to an optimal sequence of the production orders, is sought by means of an algorithm in order to reduce outline times. A visualization of production processes in real time is also regularly used, which primarily serves to create transparency with regard to the data points of the production process.

Algorithms can be used to recognize anomalies in the process risk course and for the purpose of predictive maintenance, in order to recognize such anomalies at an early stage and to notify the personnel responsible for operating the system accordingly or to be able to better predict expected future system failures and maintenance intervals on the basis of a comparison of the present operation of the system to historic operating data.

In process optimization, the determination of an optimal process or system configuration is extremely difficult and often impossible due to the usually multidimensional dependencies between all process and system configuration parameters in the system (for example production line). Up to this point, the optimization of process configurations or corresponding system settings (for example machine parameters) has essentially been based on different approaches, all of which must be preceded by an experimental phase of the actual production, during which different variations of process configurations and starting materials are tested in order to find a sufficiently good process configuration.

In continuous manufacturing, complex systems, especially systems having dozens or even hundreds of configuration parameters, often run according to manufacturer guidelines that do not take into consideration the current condition of the system and the specifics of the product being manufactured. In addition, since there are no good simulators for such complex systems, operators operate the lines based at least partially on manual process configurations based on intuition and experience, resulting in huge differences in manufacturing quality between the people running the line.

In the context of production optimization, the term "centerlining" (or "finding the center line") describes methods that are primarily used to pursue the goal of reducing process variability and increasing the system efficiency in manufacturing or processing of products. In order to measure how well such centerlining has actually been achieved for a given process, the so-called process capability, for example based on at least one process capability index, or the overall equipment effectiveness (OEE) are often used as key performance indicators (KPIs). The overall equipment effectiveness OEE is a measure of the added value of a system. With it, both its productivity and its losses can be displayed at a glance. It is defined as the product of the following factors: availability factor, performance factor, quality factor and its range of values is generally defined to be between 0 and 1 or between 0% and 100%.

The present invention is based on the object of further improving the automated determination of an optimized process configuration, in particular in the sense of centerlining, of a process for manufacturing or processing of products executable using a technical system and is configurable using various, in particular very many, process configuration parameters.

The solution to this problem is achieved according to the teaching of the independent claims. Various embodiments and refinements of the invention are the subject matter of the dependent claims.

A first aspect of the invention relates to a method, in particular a computer-implemented method, for automatically determining a process configuration that is optimized, in particular in the sense of centerlining, of a process that can be executed by means of the technical system and can be configured by means of a number M>1 of different process configuration parameters, wherein the method comprises:

(i) acquiring historical process configuration data which, for a plurality of different current or past points in time or time periods during at least one execution of the process, represent the actual process configuration of the process used in each case on the basis of actual values of the process configuration parameters that define this respective process configuration, in particular from machine settings of the system;

(ii) acquiring status data, in particular machine and/or sensor data which, for each of the current or past points in time or time periods, each represent an associated respective actual operating status of the system by means of respective actual values of a number N>1 of different status parameters of the system;

(iii) acquiring production data which represent at least one target property of the products resulting from the process that can be influenced by the process or at least one actual or target property of at least one starting material or starting product used for this purpose;

(iv) determining, in particular calculating, a process configuration of the process that is optimized with regard to a defined metric and defined by respective target values of the process configuration parameters (directly or indirectly via a corresponding system configuration of the system provided for executing the process) using an optimization method adapted to the process and based here at least partially on machine learning, using input data which comprise the production data as well as features given by the historical process configuration data and the status data or features derived therefrom; and (v) outputting target process configuration data which represent the determined, in particular calculated, optimized process configuration by means of the target values of the process configuration parameters.

The term "acquiring" data, in particular historical process configuration data and/or status data and/or production data, is to be understood in the meaning of the invention in particular as reading or receiving such data, for example in machine-readable form via a data interface or via a human-machine interface, or the sensory acquisition of such data by means of a suitable sensor system having one or more sensors in the form of corresponding sensor data.

An "actual value" of a parameter is to be understood in the meaning of the invention in particular as the respective value of the parameter which it has or had for the assigned current or earlier point in time or time period. An "actual value" therefore does not necessarily have to relate to a current value of the parameter that is present at the present point in time, but may possibly also relate to an assigned earlier point in time or time period.

The term "metric" in the meaning of the invention is to be understood in particular as a quantifiable evaluation criterion that characterizes the performance of a process, in particular with regard to its efficiency or effectiveness. A metric can be defined in particular by means of a single-value or multi-value (for example scalar or vectorial) mathematical target function on the basis of the process configuration parameters (in particular as components or variables). In particular, a metric can be determined by or based on one or more key performance indicators (KPI) for the process itself and/or its process results. In particular, the metric may relate to a throughput rate and/or production capacity or downtime of the process or the system, or to a quality measure with respect to the products resulting from the process.

The term "feature" is to be understood in the meaning of the invention, in accordance with the nomenclature typical in the field of machine learning and pattern recognition, in particular as an individual measurable property or characteristic of a phenomenon to be observed. In particular, features can be defined in such a way that they can each be assigned a numerical value which quantifies the feature.

The term "outputting" data, in particular target process configuration data, is to be understood in the meaning of the invention in particular as providing the data in machine-readable form (for example at a data interface or in the form of one or more files or data streams) or in human-readable form at one or more human-machine interfaces (HMI) (for example on a monitor).

The term "optimize" or "optimized" (and respective modifications thereof) is to be understood in the meaning of the invention as an improvement with regard to at least one desired optimization goal. This includes, but is not limited to, the possibility that an optimized result, in particular an optimized process configuration, is actually the best possible result with regard to the optimization goal(s).

As possibly used herein, the terms "comprises," "contains," "includes," "has," "has," "having," or any other variant thereof, as appropriate, are intended to cover non-exclusive inclusion. For example, a method or a device which comprises or has a list of elements is not necessarily restricted to these elements, but can include other elements which are not expressly listed or are inherent in such a method or such a device.

Furthermore, unless expressly stated to the contrary, "or" refers to an inclusive or and not to an exclusive "or". For example, a condition A or B is met by one of the following conditions: A is true (or present) and B is false (or absent), A is false (or absent) and B is true (or present), and both A and B are true (or present).

The terms "a" or "an" as used herein have the meaning of "a/one or more". The terms "another" and "a further" and any other variant thereof are to be understood to mean "at least one other".

The term "plurality" as used herein is to be understood to mean "two or more".

The term "configured" or "set up" to perform a specific function (and respective modifications thereof) is to be understood in the meaning of the invention that the corresponding device is already provided in a design or setting in which it can execute the function or it is at least settable—i.e., configurable—so that it can execute the function after corresponding setting. The configuration can take place, for example, via a corresponding setting of parameters of a process course or of switches or the like for activating or deactivating functionalities or settings. In particular, the device can have multiple predetermined configurations or operating modes, so that the configuration can be carried out by selecting one of these configurations or operating modes.

In the above-mentioned method according to the first aspect, the input data or the features represented thereby are based both on the historical process configuration data and on the status data and the production data. It is thus possible, within the framework of the machine learning-based optimization process, to take into consideration the complex relationships, which are often not previously known in detail, and mutual and often multidimensional dependencies between these different data types or features and to handle them together in an integrated approach and thus obtain overall optimized results for the optimized target process configuration to be found, and to do so in particular specifically for the system and product. In particular, a wide variety of process goals can thus be optimized simultaneously or in combination if they are mutually dependent, such as process goals that are directed toward a high process speed (for example throughput or low downtimes), on the one hand, and also to high quality of the resulting products, on the other hand.

The use of a machine learning-based optimization method also makes it possible to dispense with an experimental phase for process optimization before the actual operative or productive use of the process and a very large number of $M \gg 1$ of process configuration parameters can be taken into consideration in the scope of the optimization, which would typically not be possible with conventional methods of process optimization or only with much greater effort. Moreover, in addition to process optimization, the method also allows the simulation and prediction of process performance in dependence on different process configurations as well as the corresponding process transparency, for example with regard to the process configuration and the resulting values of the metric.

Preferred embodiments of the method according to the first aspect are described hereinafter, which in each case, unless expressly excluded or technically impossible, can be combined as desired with one another and with the further described other aspects of the invention.

In some embodiments, the input data are, at least partially, time-dependent and the method is carried out repeatedly during an execution of the process, in particular continuously, in order to dynamically determine and output target process configuration data on the basis of the input data. This means that a dynamic process optimization takes place during the operative flow of the process, so that in particular fluctuations that occur during the process, for example of the properties of the starting materials or intermediate products, environmental parameters (e.g., temperature, air pressure, humidity, etc.), or system conditions (for example fluctuations in machine speeds or tolerances, etc.) can be reacted to promptly, in particular immediately, by appropriately adjusting the process configuration.

In some embodiments, outputting the target process configuration data comprises at least one of the following steps: (i) providing the target process configuration data at a data interface of the system, in particular in the form of one or more files or data streams; (ii) transmitting the target process configuration data via a communication link, in particular a radio link, to a remote data receiver, in particular to a functional unit for controlling or monitoring the system or parts thereof; (iii) outputting or causing an output of the target process configuration data in human-readable form on a human-machine interface, HMI, in particular a remote data receiver, which can be in particular a mobile terminal, for example for operating or monitoring personnel of the system. Alternatively or additionally, however, the HMI can also be located in the vicinity of, in particular directly on the system, for example as part thereof. The provision of the target process configuration data according to at least one of the different options (i) to (iii) can be used in particular to make the data supplied via the data interface available for overall optimization of a higher-level production unit, such as an entire factory or a network of multiple production lines. In particular, options (ii) and (iii) also make it possible to monitor or control the system from a distance, in particular for the purpose of dynamic process optimization.

In some embodiments, the metric is or will be defined in such a way that it quantifies one of the following optimization goals for the process or a specific, in particular Boolean, combination of two or more of these optimization goals: (i) reducing, in particular minimizing, the process variability of the process, in particular to achieve an optimal process course; (ii) reducing, in particular minimizing, the product variability of the products resulting from carrying out the process, in particular in order to achieve optimal product quality; (iii) increasing, in particular maximizing, efficiency and/or effectiveness, especially the overall equipment effectiveness (OEE), of the process. At least one, preferably all, of these optimization goals can be defined by means of corresponding key performance indicators (KPI). These embodiments are therefore usable in particular with regard to a desired centerlining of a process executable on the system.

In some embodiments, the status parameters are or will be selected in such a way that they individually or cumulatively represent one or more of the following actual operating statuses of the system for the at least one current or earlier point in time or time period:
  throughput rate or quantity, in particular minimum throughput rate or quality, of the manufactured or processed products, in particular related to the overall system or the entire process or to one or more individual system sections or process sections;
  error rate, error quantity, or error type of errors that have occurred during the process course, in particular as evidenced by error or alarm messages that have occurred, error rate, error quantity, or error type of errors that have occurred during the process course, in particular as evidenced by error or alarm messages that have occurred for quantities or amounts of flawed products from the process;
  the respective operating speed, in particular the maximum operating speed that has occurred, of at least one moving part of the system;
  one or more throughput loss times or points in time or time periods at which or during which reduced performance or a standstill, in particular a breakdown, of the system occurred;
  items of information or identifiers of reasons that resulted in reduced performance or a standstill of the system.
  Points in time, in particular actual points in time or planned points in time, for the start or end of process operation
  Data types or formats of the input data or output data, in particular for displaying the target process configuration parameters.

In some embodiments, the historical process configuration data are or will be selected such that they individually or cumulatively represent one or more of the following configuration options of the system for the at least one current or earlier point in time or time period: one or more settings, in particular machine settings or target operating statuses, such as target values for control or regulating variables, of the system.

In some embodiments, the production data are or will be defined in such a way that they represent one or more of the following target properties of the products to be obtained from the process or at least one starting material or starting product used for this purpose:
- kind, type, quality, or selected physical or chemical properties of the starting materials or starting products used;
- form or type of the provision of the starting materials or starting products used;
- kind, type, quality, or selected physical or chemical target properties of the products to be obtained from the process;
- form or type of the provision of the products to be obtained from the process.

In some embodiments, the number M of process configuration parameters and the number N of status parameters are or will be selected such that $N+M \geq 10$, in particular $N+M \geq 30$, especially in particular $N+M \geq 100$. Thus, in particular, very complex processes or system configurations can be used, which generally can no longer be controlled or can only be controlled with much greater effort using conventional means of process optimization, in particular effectively and quickly, in particular in or almost in real time.

In some embodiments, the status data, the historical process configuration data, and/or the target configuration data are stored, in particular continuously, and read at a later point in time and used as status data or historical process configuration data in the context of carrying out the method iteratively. In particular, the storage can take place in a cloud environment, so that location-independent remote access to the data is facilitated or made possible in the first place. This can in particular also be used to exchange data between different system or production lines in order to make data obtained by means of one item of system also available to other systems for their operation or process optimization.

In some embodiments, the optimization method includes: (i) repeated calculation of a process configuration of the process (in particular the system) that is optimized with respect to the metric and represented by means of a respective set of preliminary target process configuration parameters to be determined, wherein each calculation is carried out by means of a respective calculation method from an ensemble of multiple mutually alternative calculation methods and each using features from the input data, and wherein at least one of the calculation methods of the ensemble is or will be adapted to the process using machine learning; and (ii) establishing the target process configuration parameters based on a selected set of the set of the sets of preliminary target process configuration parameters, wherein this selection is carried out so that the selected set best meets a predetermined evaluation criterion for the sets of all sets. In this way, the robustness and thus also the reliability of the process optimization can be further increased, since multiple different calculation methods are used and the best solution according to the evaluation criterion is selected from the ensemble.

In some of these ensemble-based embodiments, the evaluation criterion is or will be defined in dependence on (i) for which set of the preliminary target process configuration parameters the metric was best met; or (ii) for which number of the process configuration parameters of the set it is true that its respective value in the cross-comparison using a measure of similarity within the set of the respective values for this process configuration parameter occurs relatively most frequently from all sets of preliminary target process configuration parameters, wherein each set of process configuration parameters meets the evaluation criterion better the higher this number is for this set.

In particular, at least one of the calculation methods of the ensemble can be or become selected in such a way that it is not a machine learning (ML)-based calculation method. In this way, the advantages of ML-based and non-ML-based calculation methods can be combined in the context of the above-mentioned ensemble methodology, which in turn can be used to increase the variety of calculation methods contained in the ensemble and, on this basis, to increase the robustness, reliability, and broad usability of the method according to the first aspect.

In particular, according to some embodiments, at least one of the calculation methods of the ensemble, which is not a machine-learning-based calculation method, can include: (i) segmenting the chronological progression occurring during execution of the process of a measured variable that is dependent on the process course and directly or indirectly influences the metric such that each segment defines a time section of this chronological progression within which the value of the measured variable remains within a predetermined limited tolerance range around the starting value or mean value of the measured variable in the time section (for example starting value+/−x %), and a segment change to another segment occurs when the value leaves this limited value range (the measured variable can be represented in particular by the status data or can be available in addition thereto); (ii) determining the preliminary target process configuration parameters of the set of preliminary target process configuration parameters associated with this calculation method in such a way that the preliminary target process configuration parameters of the set are determined in dependence on those actual process configuration parameters according to which the process was configured during that of the segments, in which the value of the measured variable in a cross-comparison among all segments has optimized, in particular maximized, a defined optimization variable. The preliminary target process configuration parameters of the set can be determined in particular in such a way that they correspond to the mentioned actual process configuration parameters.

In some of these segment-based embodiments, the measured variable is or will be selected such that it specifies a measure of at least one of the following variables or a combination of at least two such variables: (i) a throughput rate of the process; (ii) an availability (e.g., chronological availability, uptime) of the process; (iii) a quantity of the manufactured or processed products; (iv) a quality of manufactured or processed products; (v) the respective value of at least one of the actual process configuration parameters. These variables share the feature that their optimization is regularly accompanied by process optimization with regard to the highest possible OEE.

In some of the segment-based embodiments, the optimization variable is or will be defined as or in dependence on one of the following variables: (i) average value of the measured variable during the respective segment; (ii) average value of the measured variable during a defined continuous or cumulative time period in the respective segment of a defined duration T that is the same for all segments, wherein the respective time period within a segment is selected in such a way that it optimizes the measured variable within the segment in cross comparison among multiple, in particular all possible time periods of the duration T within the segment; (iii) segment duration. These optimization variables have the advantage in particular that on the one hand they can be determined easily and quickly, and therefore above all facilitate dynamic process optimization, while on the other hand they filter out many fluctuations and disturbances, in particular those that occur irregularly or at higher frequency, and and can thus be used to further increase the robustness and reliability of the optimization method.

In some embodiments, the optimization method has at least one calculation method that is adapted to the process and is based on machine learning, ML, in which an ML model is used that uses features from the input data as input and supplies a value, in particular a scalar or vectorial value, for the metric (for example a measure of a process course speed or throughput rate) as an output. In particular, these embodiments can be used both for training the model, in particular in the sense of supervised learning, and also in the context of determining or predicting optimized target process configuration parameters in or for the operative operation of the system, in particular in the context of the above-mentioned ensemble method.

In some of these embodiments, the features used as input by the ML model are at least partially calculated using an optimization method, in particular Bayesian or based on an artificial neural network, and are selected as a subset from the set of all features in dependence on their respective influence on the metric. In particular, a subgroup of available features can thus be selected that contain the most information about the overall system efficiency (OEE) or the information that is most favorable for process optimization. In this way, the efficiency of the method can be secured and optimized because features with a high influence on the process optimization, in particular on the OEE, can continue to be used, particularly preferably, while less influential features are not taken into consideration or only to a lesser extent and thus the set of features can be effectively limited. Artificial neural networks can advantageously be used here, in particular for feature engineering and for generating features having a probability of failure.

In some embodiments, at least one of the following variables or at least one variable dependent thereon is determined for at least one of the parameters provided by means of the input data as a process configuration parameter or status parameter for a defined time window sliding over time and used as a feature by the ML model:
  the sliding average of the respective actual values of the parameter whose associated points in time or time periods are within the time window,
  an exponentially weighted sliding average of the respective actual values of the parameter, whose assigned points in time or time periods are within the time window, wherein the weighting is carried out by means of an exponential function such that the actual values at more recent points in time are weighted higher than the actual values at older points in time;
  the sliding average of the standard deviation of the distribution of the actual value of the parameter whose associated points in time or time periods are within the time window;
  the number of changes in the actual value of the parameter within the time window;
  the maximum number of changes of the actual value of the parameter within the time window, with respect to a defined time span;
  the cumulative absolute duration or relative duration in relation to the duration of the time window of those time periods during which, according to the actual values of the parameter, the process was stopped or the system failed or was at a standstill;
  a numeric variable that corresponds to a value of the parameter and characterizes this value if this parameter itself characterizes a non-numerical variable.

Features defined in this way can be used particularly advantageously to smooth the value curve of the features for the purpose of increasing the robustness of the method against short-term fluctuations in the parameter values over time, and in the case of the latter option also to be able to incorporate parameters which are non-numerical as such in nature into the method by means of corresponding numeric values as features.

These features advantageously have in common that they can be determined particularly easily and without a great deal of computing effort and, moreover, have good robustness in relation small or irregular process fluctuations.

In some embodiments, determining the target process configuration parameters based on the ML model comprises: (i) establishing a local or absolute optimum in the chronological progression of the value of the metric output as the output by the ML model based on the input data; and (ii) determining the target process configuration parameters in dependence on the actual process configuration parameters corresponding to the established optimum from the input data. In the case of a multi-element metric (vector), as can occur when using multiple KPIs, the optimum to be determined can be defined as an optimum with respect to the metric as a whole (instead of only one metric element). These embodiments are characterized in that they enable a process configuration that is optimal in terms of metrics to be found in a simple manner.

In some embodiments, the ML model uses one or more of the following ML methods: random forests, gradient boosting regression; artificial neural network. Within the available set of known ML methods for the formation of ML models, especially the above-mentioned three methods have each proven to be particularly suitable, in particular as very efficient and high-performance and at the same time sufficiently accurate, for the purposes of process optimization according to the present method according to the first aspect.

In some embodiments, the method is used to optimize a variable parameterized process configuration of a technical system for manufacturing or processing products of at least one of the following product types:
  products which comprise material made of paper, cardboard, or paperboard;
  films;
  food;
  steel;
  tobacco;
  textiles;
  pharmaceuticals.

In some embodiments, the method also comprises at least one of the following steps, in particular executed dynamically during the process course: (i) automatically setting the system using the output target process configuration data in order to configure the system to be able to execute the process according to the optimized process configuration; (ii) automatically controlling the system to execute the process according to the optimized process configuration defined by the output target process configuration data. In this way, an automatic configuration or control of the system can be achieved, in particular dynamically, on the basis of the optimized process configuration found.

A second aspect of the invention relates to a plant control system that is configured to configure or control a process executable on a technical system for manufacturing or processing products according to the method according to the first aspect of the invention according to the optimized process configuration.

In particular, the plant control system itself can represent part of the system, or it can be arranged and operated separately from it, in particular also at a different location. The plant control system can in particular be or have a data processing system, in particular a local or distributed computer system.

A third aspect of the invention relates to a computer program comprising commands which cause a plant control system according to the second aspect to execute the method according to the first aspect.

The computer program can in particular be stored on a non-volatile data carrier. This is preferably a data carrier in the form of an optical data carrier or a flash memory module. This can be advantageous if the computer program as such is to be handled independently of a processor platform on which the one or the multiple programs are to be executed. In another implementation, the computer program can be present as a file on a data processing unit, in particular on a server, and can be downloaded via a data connection, for example the Internet or a dedicated data connection, such as a proprietary or local network. In addition, the computer program can have a plurality of interacting individual program modules, which can even run on different computers in the sense of "distributed computing" and can interact overall. The computer program can in particular be provided or configured for execution in a cloud environment and interact with local client applications or web interfaces (for example browsers) for information output or user interaction.

The plant control system can accordingly have a program memory in which the computer program is stored. Alternatively, the plant control system can also be set up to access a computer program available externally, for example on one or more servers or other data processing units, via a communication connection, in particular in order to exchange data with it that are used during the course of the method or computer program or represent outputs of the computer program.

The features and advantages explained with respect to the first aspect of the invention also apply correspondingly to the further aspects of the invention.

Further advantages, features, and possible applications of the present invention result from the following description in more detail in conjunction with the figures.

In the Figures:

FIG. 1 schematically shows an exemplary embodiment of a technical system for executing a configurable process for manufacturing or processing products, and a black box representation of this process including its input and output data;

Figure 1:
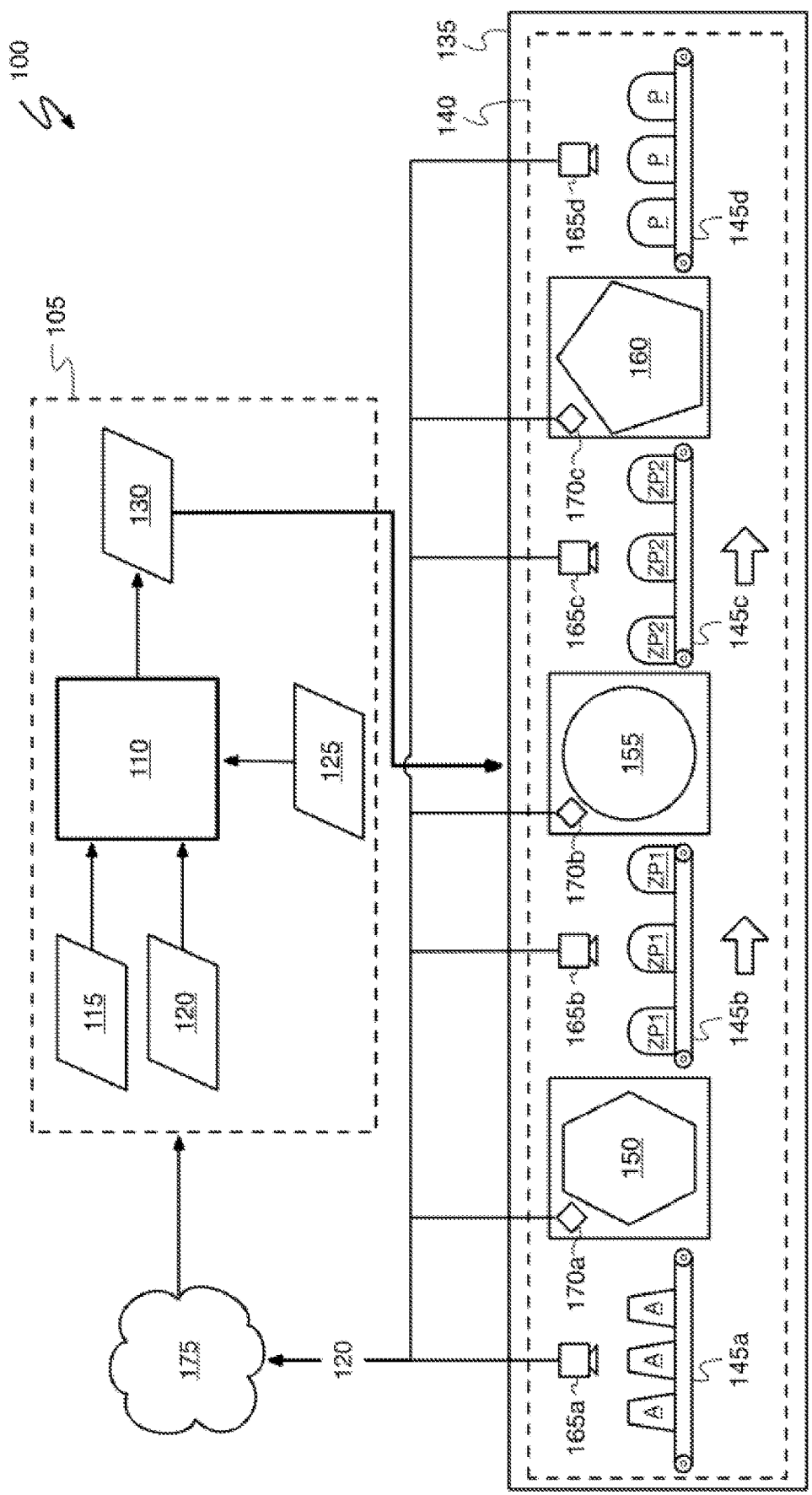

FIG. 1 illustrates, according to one exemplary embodiment of the invention, an overview representation 100, on the one hand, of a technical system 135 for executing a process 140, which is configurable by means of a number M>1 of different process configuration parameters, for manufacturing or processing of products and, on the other hand, a method represented by an optimization process 105 for determining an optimized process configuration of the process 140, in particular in the sense of centerlining. Since the technical system 135 is provided for executing the process 140, the optimized process configuration of the process 140 corresponds to a correspondingly optimized configuration of the system 135.

The system 135 has here, for example, three different processing stations 150, 155, and 160, wherein these processing stations can basically be any devices for manufacturing or processing products P, in particular also of starting materials or starting products A or intermediate products ZP1 or ZP2 for their manufacturing. The processing stations 150, 155, and 160 can in particular be devices for mechanical, electromagnetic, optical, thermal, or chemical processing of the starting materials/products A or intermediate products ZP1 or ZP2. To transport the starting materials/products A or intermediate products ZP1, ZP2, the system 135 has various conveyor devices 145a to 145d, which in particular can be or comprise conveyor belts.

Furthermore, the system 135 has a sensor system, which in particular can comprise a plurality of different sensors 165a to 165d and 170a to 170c at different points of the system 135. Such sensors can include sensors 165a to 165d in particular, which can sensorially acquire a current position or orientation or a current status or some other property of the starting materials/products A or intermediate products ZP1, ZP2 or final products P. In addition, the sensor system can comprise one or more sensors 170a to 170c, using which one or more current statuses, in particular machine statuses, of the processing stations 150, 155, or 160 or other parts of the system 135, such as the conveyor devices 145a to 145d, can be acquired. In particular, such statuses may relate to the position or alignment, kinetic parameters (such as velocity, rotational velocity, and acceleration/angular acceleration) of moving parts of the system or a temperature or a local pressure in a region of the system.

The values of the sensorially acquired measured variables acquired during the operation of the system 135 repeatedly or continuously for successive acquisition points in time ("points in time") or acquisition time periods ("time periods") are provided in the form of status data 120 by the sensor system itself or possibly a unit of the system (not shown) further processing the raw data of the sensor system to the optimization process 105 in the form of a set of N>1 status parameters, which can be done in particular via a communication network, for example including a data technology cloud 175, and possibly by means of intermediate storage there. The status data 120 thus represent, for each acquisition point in time or acquisition time period, an associated respective actual operating status of the system 135 by means of respective actual values of a number N>1 of different status parameters of the system 135.

The system 135 can be localized, for example in the sense of a production line, at a single location, in particular in a manufacturing system, or instead over multiple locations spaced apart from one another, possibly even far apart from one another (for example in different geographical locations, such as cities, countries, or even continents), wherein the units of the system 135 located at the various locations, however, form a virtual or logical unit, on the one hand with respect to the product or material flow and on the other hand with respect to the control of the system 135, and thus for the purpose of process optimization can be viewed as a single system 135, which can execute the process 140 as a whole.

The optimization process 105, which is illustrated in the upper part of FIG. 1, can be executed by a plant control system 110, which in particular can be or have a data processing unit. It is also possible for the plant control system 110 to be constructed from multiple different units, in particular data processing units, which can be spatially distributed over different locations in the sense of a distributed computer system and can be networked with one another via communication links.

The optimization process 105 receives as input data, on the one hand, the above-mentioned status data ("SD") 120 and, on the other hand, historical process configuration data 115, which for the current or past points in time or time periods already mentioned in conjunction with the status data, during at least one execution of the process, represent the process configuration of the process 140 actually used in this case on the basis of actual values of the process configuration parameters defining this respective process configuration. For a complex process 140, the total number Y=M+N of the process configuration parameters and status parameters is typically high (for example Y>10 or Y>30 or even Y>100).

Furthermore, the input data also comprise production data ("PD") 125, which represent at least one target property of the products P resulting from the process that can be influenced by the process 140 or at least one actual or target property of at least one starting material or starting product A used for this purpose. In particular, the production data can represent a specification of the products P to be produced or obtained by means of the process 140, and optionally also their arrangement, packaging, etc. The production data 125 thus serve in particular as boundary conditions for the optimization process 105.

As a result of optimization process 105, a set of target process configuration parameters 130 determined by means of the optimization process 105 is output, in particular in the form of configuration data, and is used to control, in particular to set, the system 135 in order to configure the system 135 for the further chronological progression of the process 140 until possibly an update of the target process configuration parameters at a later point in time according to the output set of the target process configuration parameters 130.

Various embodiments of the optimization process 105 are explained below with reference to FIGS. 2 to 10.

Figure 2:
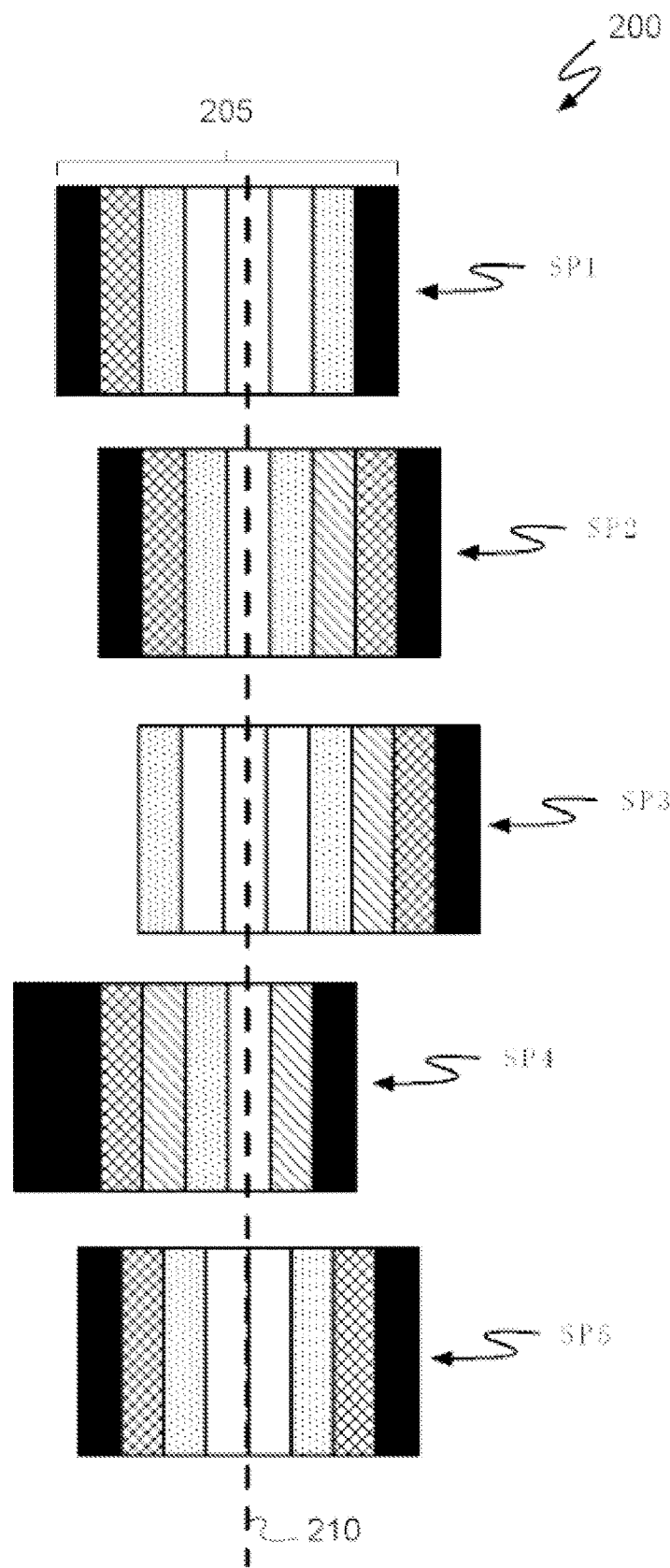
FIG. 2 shows a schematic illustration to explain centerlining.

FIG. 2 schematically illustrates the principle of centerlining (i.e., determining the centerline or center line) by means of an exemplary set 200 of (only) five process configuration parameters (setpoints) SP1 to SP5 of the system 135 for the sake of clarity. In practice, a significantly higher number of process configuration parameters are typically taken into consideration in the context of centerlining.

When centerlining in relation to a process, such as the process 140 in the present example, it is now a matter of finding such a configuration of the process and using it for at least one subsequent period of time for the further operation of the system, the system 135 here, which is optimized with respect to the optimization goals of reducing the process variability and/or increasing the system efficiency in the manufacturing or processing of products. In order to measure how well such centerlining was actually achieved for the process, key performance indicators (KPI) are often used, in particular the process capability, or overall equipment effectiveness (OEE), which represent at least one of the above-mentioned optimization goals. In this case, an optimization is sought not only by optimizing an individual process configuration parameter, but by an overall optimization over the entire set of process configuration parameters.

Various discrete configuration options 205, i.e., parameter values, are illustrated in FIG. 2 for each of the process configuration parameters SP1 to SP5 using a respective bar grid. The bars are partially filled or hatched to indicate the extent to which the parameter value characterized by the respective bar differs from that due to the center line (centerline) 210 sought, i.e., the optimized set of values for the process configuration parameters SP1 to SP5. Very good or even the best possible values are represented by unfilled bars, with increasing strength of the hatching or filling towards the edge regions of the respective bar grid, the parameter values move further and further away from the center line 210 sought.

The goal of centerlining is therefore to determine the respective values for all of the process configuration parameters SP1 to SP5 such that they together form a center line 210 which represents an optimum with regard to a set of one or more KPIs used as a target variable. If the process configuration parameters SP1 to SP5 were independent of one another, then each of the process configuration parameters SP1 to SP5 could be optimized individually and independently of the others with respect to the target variable. In general, however, the individual process configuration parameters are especially not (all) independent of one another, so that in the context of centerlining, the optimum has to be found based on the set of process configuration parameters SP1 to SP5 as a whole and not only on the basis of an individual respective optimization of the individual process parameter values, in order to optimize the target size.

Figure 3:
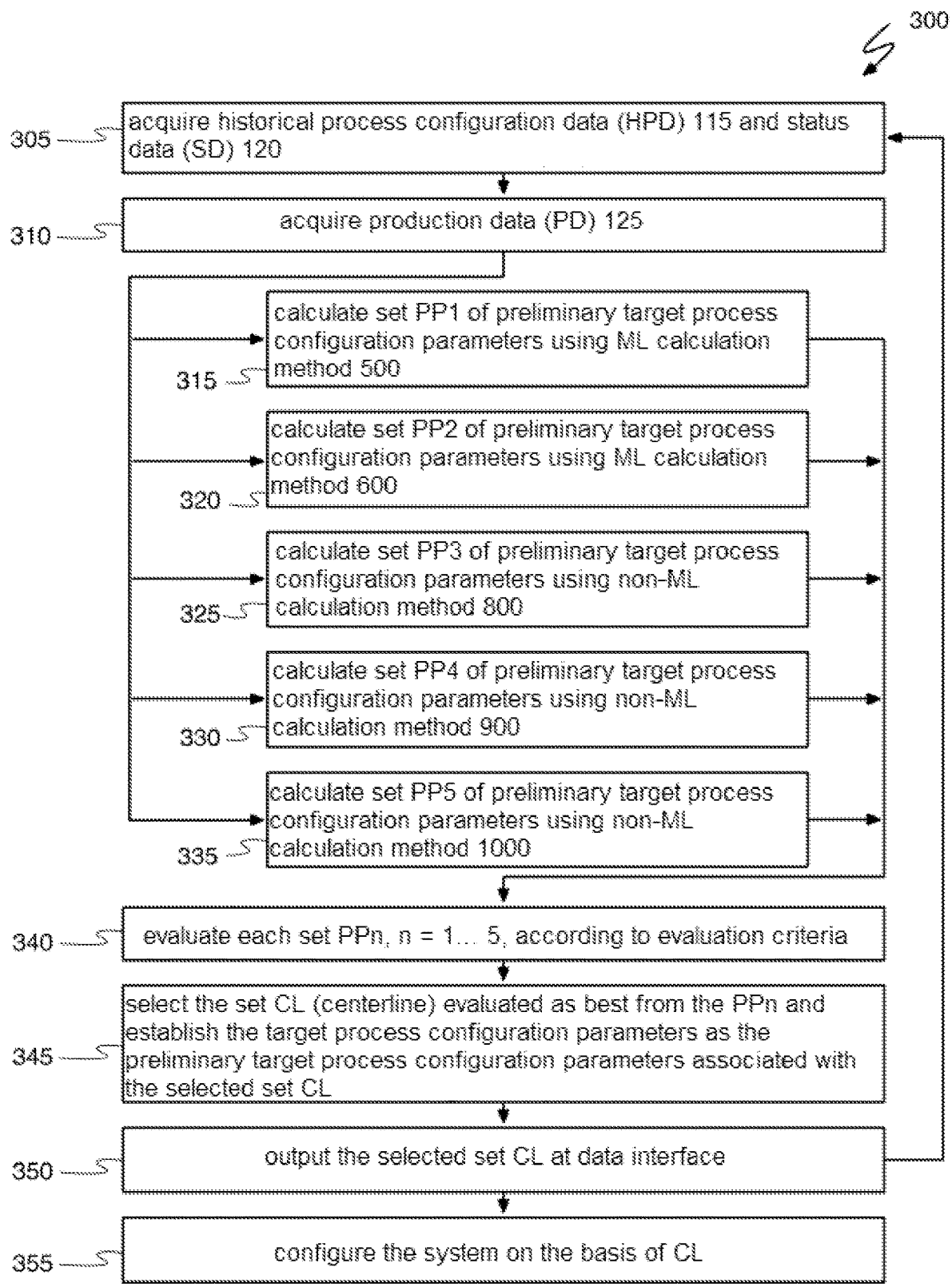
FIG. 3 shows a flowchart to illustrate an exemplary embodiment of the method for process optimization according to the invention.

FIG. 3 shows a flowchart to illustrate an exemplary embodiment 300 of the method for process optimization according to the invention, in which a process optimization based on various individual optimization methods is used by means of the optimization process 105.

In the method 300, as illustrated here by way of example using step 305, both historical process configuration data ("HPD") 115 and also status data ("SD") 120 are required, as previously described with reference to FIG. 1. The acquisition of these data can include in particular the sensory measurement of the variables represented by this data themselves or instead only the reception of the data already obtained, in particular via a data interface or by reading it out from a memory.

In addition, in a step 310, the production data ("PD") 125 are acquired. The acquisition of the various data 115, 120, and 125 can alternately take place simultaneously within the same step or, as illustrated here, distributed over multiple steps.

The actual optimization now begins, for which purpose various optimization methods are used in the present method 300, which are each implemented by a corresponding calculation method 500, 600, 800, 900, or 1000 and are carried out in corresponding steps 315, 320, 325, 330, or 335, which are in particular executable in parallel. In each of these calculation methods, a corresponding set PP1, PP2, PP3, PP4, or PP5 of preliminary target process configuration parameters is calculated. Each of these sets depicts the optimization result of the respective calculation method. "Preliminary" means here that these sets of preliminary target process configuration parameters do not yet finally establish the centerline CL ultimately resulting from the method, since the centerline, as described below, first has to be selected as one of these sets.

To determine a centerline CL, i.e., the target process configuration parameter to be output and, in particular, also to be determined at least partially for the configuration of the system 135, in the scope of the method 300, the various calculation methods 500, 600, 800, 900, and 1000 are considered as an ensemble of different optimization methods and the centerline is determined by selecting a set of the sets PP1, PP2, PP3, PP4, or PP5 of preliminary target process configuration parameters obtained from this ensemble that is optimal according to an evaluation criterion. For this purpose, the sets PP1, PP2, PP3, PP4, and PP5 are first evaluated in a step 340 according to the evaluation criterion and then in step 345 the set rated best according to the evaluation criterion is defined as centerline CL.

Finally, the centerline is output in step 350, in particular at a data interface to the technical system 135 to be configured, so that it is configured in step 355 according to the centerline CL.

However, it should be noted that the previously described use of an ensemble of different calculation methods is only one of many options. In particular, it is also possible to use only a single calculation method based on machine learning, thus in the present example one of the calculation methods 500 and 600. In this case, steps 340 and 345 are obsolete, since then there is only a single set of preliminary target process configuration parameters, which at the same time represents the centerline CL.

Figure 4:
FIG. 4 shows a schematic illustration to explain an ensemble method used in the scope of the method from FIG. 3, according to one exemplary embodiment.

Reference is also made to FIG. 4 to explain an exemplary embodiment of an ensemble method for use in the method 300, in particular in its steps 340 or 345. In an expansion of the illustration from FIG. 2, a process 140 having seven process configuration parameters (setpoints) SP1 to SP7 is considered for this purpose. This small number of process configuration parameters is again chosen for the purpose of easier illustration. In the practical implementation of the method, in dependence on the process complexity, significantly higher numbers of process configuration parameters are used in many cases.

The table 400 shown in FIG. 4 shows, in each of columns 2 to 6, the sets PP1 to PP5 of preliminary target process configuration parameters determined by means of an assigned one of the calculation methods 500, 600, 800, 900, or 1000. The individual process configuration parameters SP1 to SP7 are shown in the rows of table 400.

In order to select the best set of preliminary target process configuration parameters as centerline CL in terms of process optimization, it is now determined individually for each of the process configuration parameters SP1 to SP7 in a row-by-row cross-comparison across the columns which of the parameter values occurring in the context of the various sets PP1 to PP5 occurs most frequently in the cross-comparison. For example, this is the value "1" for the parameter SP1 and the value "0" for the further parameter SP2. In table 400, these most frequently occurring values are each enlarged and marked in bold. In particular when the possible parameter values can be continuous, the value range for each can be discretized by defining value intervals, wherein each value interval is assigned its starting, end, or mean value as a discrete value, for example.

Then, as shown in the last row of table 400, for each of the sets PP1 to PP5 it is counted how large the number K of its parameter values is, which belonged to these parameter values that occurred most frequently in the rows. The number K here plays the role of the evaluation criterion from step 340 of the method 300 from FIG. 3. In particular, the value K=4 results from table 400 in the case of set PP1 and for the set PP2 the value K=5 and thus at the same time, considered across all sets PP1 to PP5, the highest result for K. Thus, in step 345 of the method 300, the parameter set PP2 is selected as the centerline CL (marked with an asterisk).

Although in the context of the ensemble methodology, ultimately only a single one of the preliminary target process configuration parameter sets PP1 to PP5 is selected as centerline CL and thus in this sense only one of the calculation methods "wins" based on the evaluation according to the evaluation criterion, the other calculation methods also influence the result of the centerline selection via the path of steps 340 and 345 of the method 300. By means of the ensemble methodology, selection decisions for process optimization can be made that are based on multiple different calculation methods and thus deliver particularly robust and reliable results, especially with regard to interference from measurement errors or model inaccuracies in the calculation methods.

Figure 6:
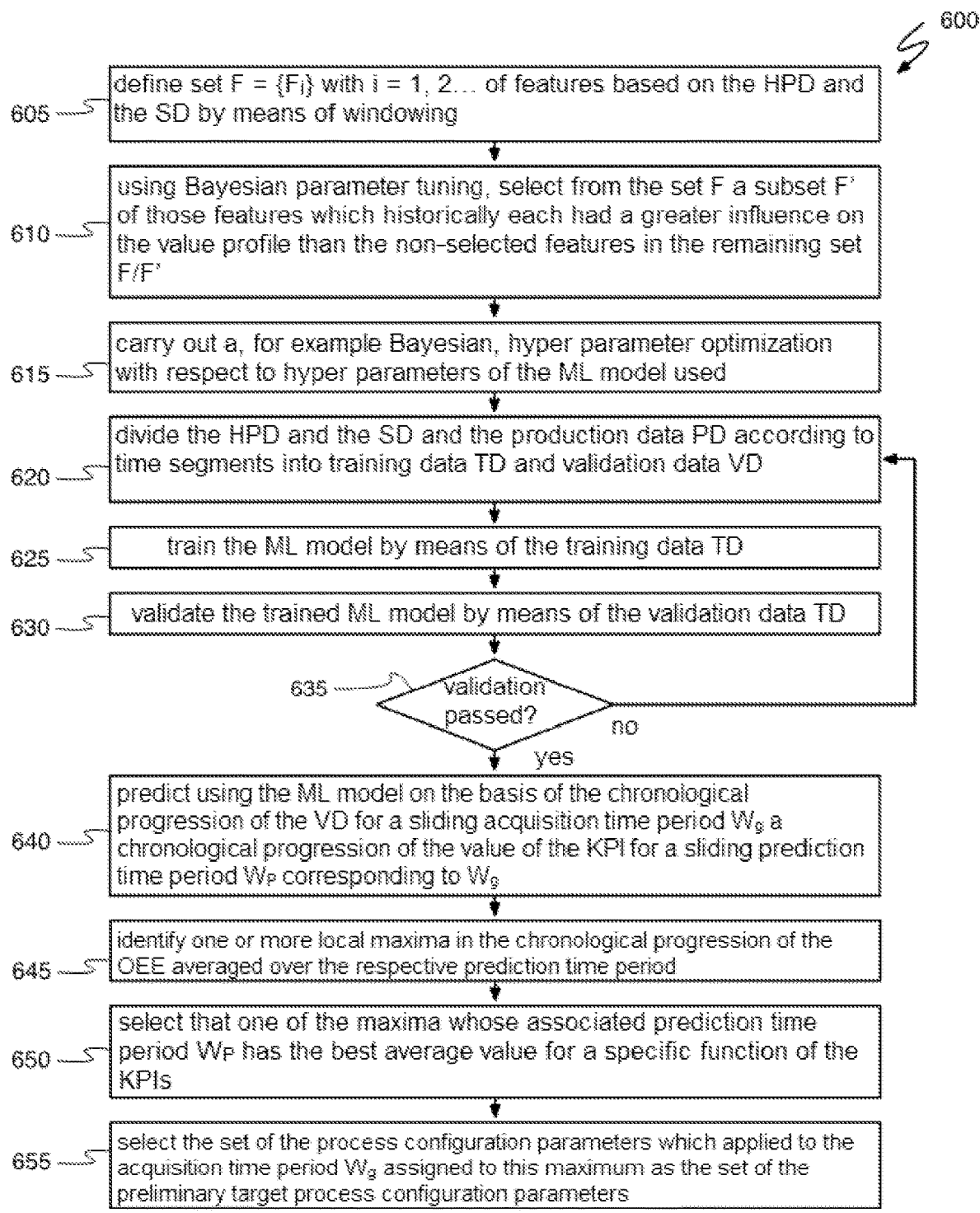
FIG. 6 shows a schematic illustration of a second ML calculation method, according to some embodiments of the invention.
Figure 7:
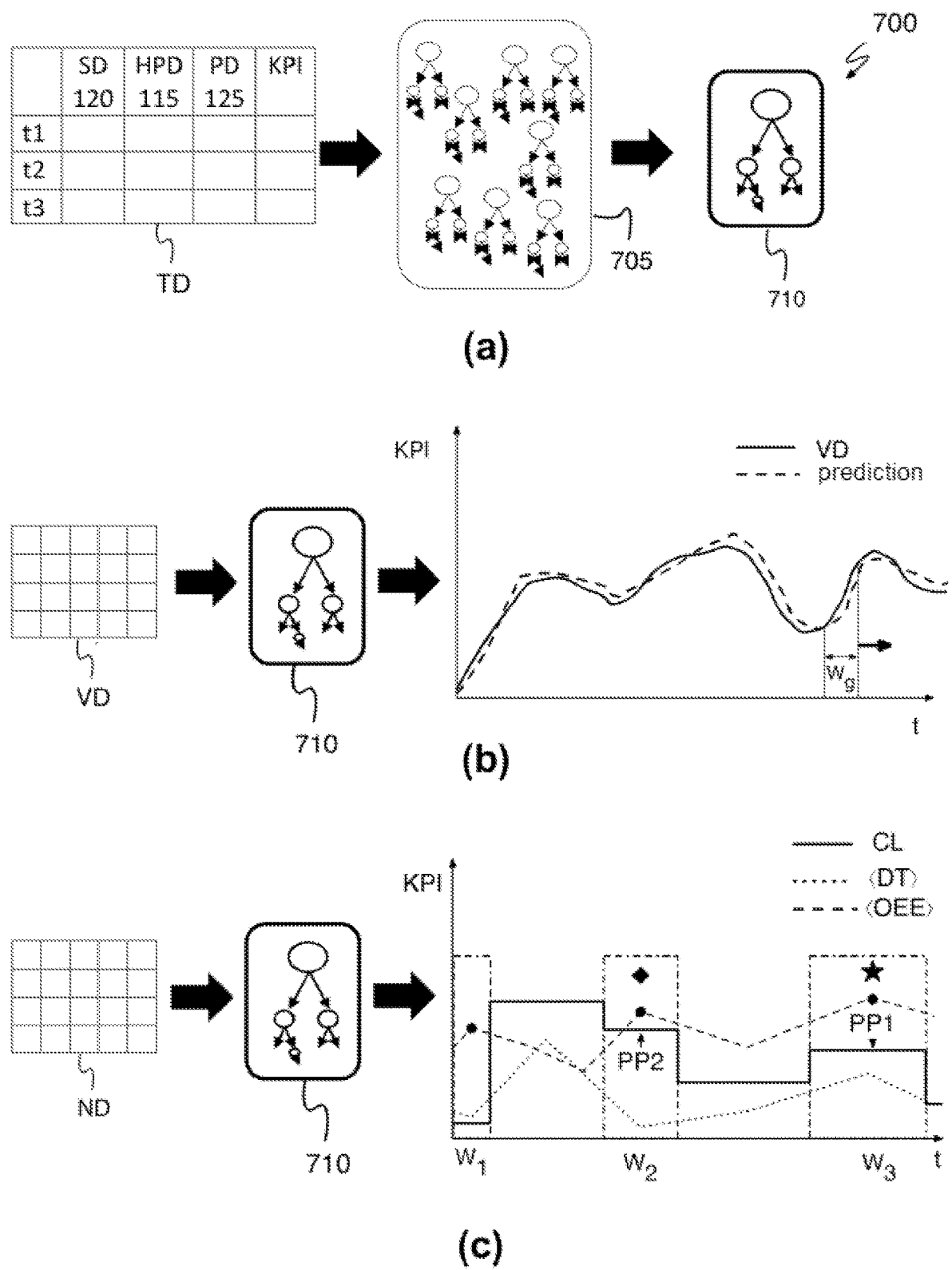
FIG. 7 shows a schematic illustration to explain the methods from FIGS. 5 and 6 and the difference between them.

Various exemplary calculation methods 500, 600, 800, 900, and 1000 will now be explained in detail with reference to the following FIGS. 5 to 10, wherein FIG. 7 shows an additional illustration 700 to explain the methods 500 and 600 from FIGS. 5 and 6 and their difference.

Figure 5:
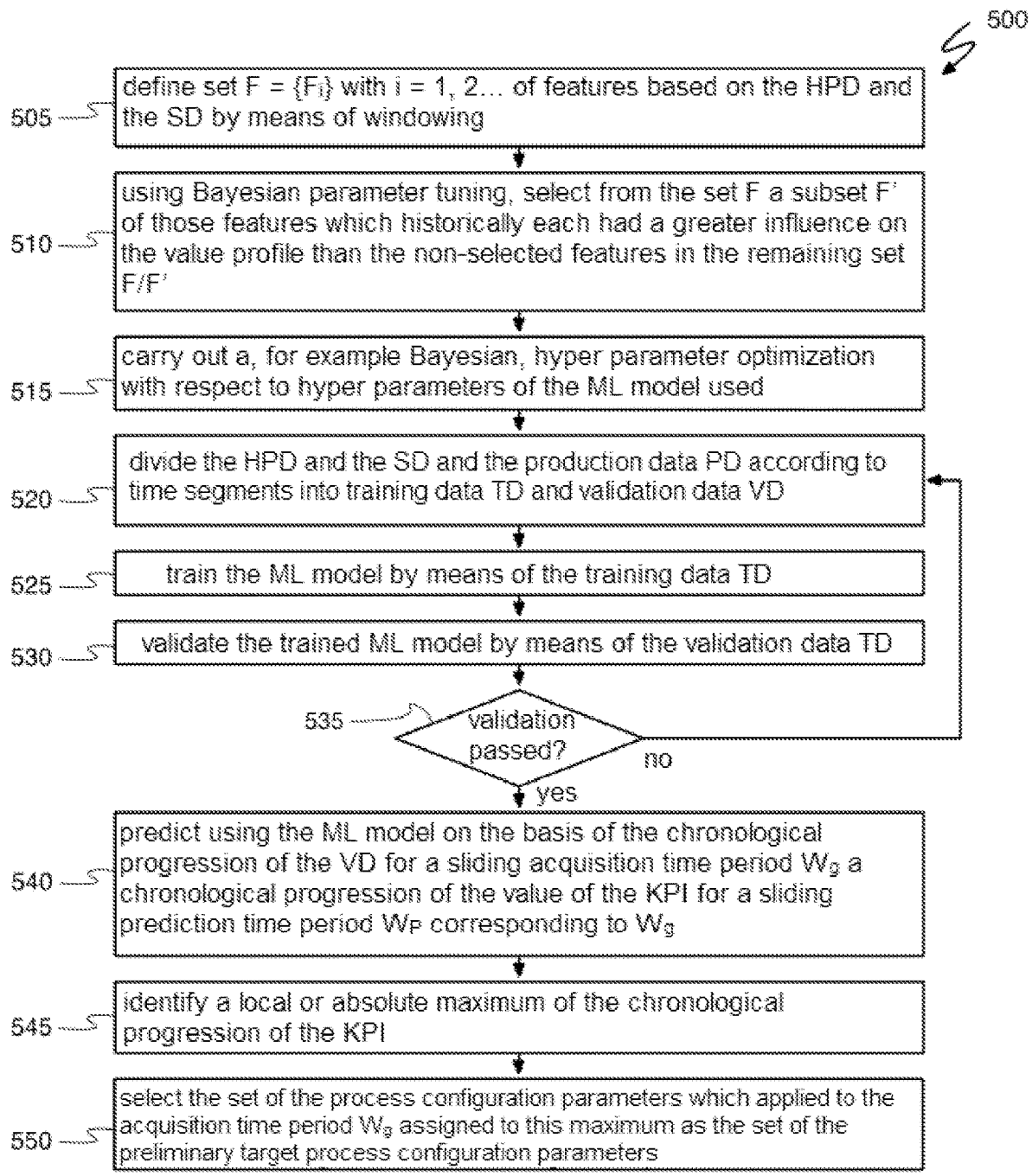
FIG. 5 shows a schematic illustration of a first ML calculation method, according to some embodiments of the invention.

The calculation method 500 illustrated in FIG. 5 is an exemplary machine learning (ML)-based method for determining a set of preliminary target process configuration parameters, for example the set PP1 in the method 300.

In the method 500, starting from a previously selected ML model type, in a step 505, on the basis of the historical process configuration data HPD (or 115) and status data SD (or 120) available as input data—as illustrated in FIG. 1—a set $F=\{F_i\}$, with i=1,2, . . . , of features (in the sense of machine learning) is defined. A so-called "window approach," which is often also referred to as "windowing," can in particular be used for this purpose. The chronological progression of the input data is viewed through a time window of fixed duration that slides along the time direction, and one or more of the features $F_i$ are defined on the basis of the chronological progression of the actual values of the individual parameters from the input data in the respective time window. In particular, this can be done in such a way that at least one of the following variables or at least one variable dependent thereon is determined for the sliding time window and used as a feature by the ML model:

the sliding average of the respective actual values of the parameter whose associated points in time or time periods are within the time window;

an exponentially weighted sliding average of the respective actual values of the parameter, whose assigned points in time or time periods are within the time window, wherein the weighting is carried out using an exponential function such that the actual values at more recent points in time are weighted higher than the actual values at older points in time;

the sliding average of the standard deviation of the distribution of the actual values of the parameter whose associated points in time or time periods are within the time window;

the number of changes in the actual value of the parameter within the time window;

the maximum number of changes of the actual value of the parameter within the time window, with respect to a defined time span;

the cumulative absolute duration or relative duration in relation to the duration of the time window of those time periods during which, according to the actual values of the parameter, the process was stopped or the system failed or was at a standstill;

a numeric variable that corresponds to a value of the parameter and characterizes this value if this parameter itself characterizes a non-numerical variable.

The features to be subsequently used as input by the ML model can then be at least partially optimized in step 510 using an optimization method, for which Bayesian parameter tuning is particularly suitable as a methodology here, and in dependence on their respective influence on the metric, can be selected as a subset from the set $F=\{F_i\}$ of the defined features. It is favorable if the selection is made in such a way that in particular or exclusively those features are selected from the set F that had a particularly large influence on the value curve of the metric (for example OEE or throughput rate of the system) during the historical chronological progression considered. In particular, a subset F' of such features can be selected from the set F that each historically had a greater influence on the value curve of the metric than the non-selected features in the remaining set F/F'.

The chronological progression of their values for the historical period under consideration, in which the sliding time window moved, is then available for the selected features, wherein one of the values corresponds to each chronological position of the time window.

For the purposes of the present invention, among the large number of known ML procedures and methods, it has been found in particular that ML models or methodologies based on decision trees, and in particular those types that are known to a person skilled in the art as "random forest" or as "gradient boosting" (gradient-boosted regression) models or methods, are advantageous because they can be used particularly quickly and with limited computing effort while at the same time having a sufficiently high accuracy of the results.

In the method 500, with regard to the selected ML model, a hyperparameter optimization of the ML model then follows in a step 515, for which purpose in particular a method known to a person skilled in the art as Bayesian (hyperparameter) optimization can be used.

In the field of machine learning, the term "hyperparameter optimization" refers to the search for optimal hyperparameters. A hyperparameter is a parameter of the ML model which is used to control its training algorithm and whose value, in contrast to other parameters (in particular of weights of an artificial neural network to be determined during training or of node properties of a decision tree), have to be defined before the actual training of the ML model. In the case of neural networks, for example, the number of levels of the network and the number of nodes per level are parameters of the neural network (ML model). In the case of decision trees, in particular the maximum depth of the decision tree or the minimum number of data points required to define a further branch or other complexity parameters concerning the structure and size of the decision tree can each be hyperparameters for the decision tree (ML model).

Now that the ML model to be used has been defined, the next step in the method 500 is a training phase. In step 525, the model is trained by means of training data TD selected from the input data provided to the model according to FIG. 1, i.e., the historical process configuration data HPD, the status data SD, and the production data PD, in terms of machine learning. The selection of the training data TD takes place in an upstream step 520, in which the input data are separated according to different time intervals and divided into training data TD on the one hand and validation data VD on the other hand. In particular, the validation data may correspond to later time intervals in the time period represented by the input data than the training data.

In FIG. 7(*a*), the training step 525 is graphically illustrated. The training data TD are shown here in the form of a table of values in which the associated values for the status data SD (or 120), the historical process configuration data HPD (or 115) are listed for various points in time t1, t2, etc. depicted by the input data. In addition, the associated value of the metric to be optimized for an immediately subsequent time period based on the corresponding input data is shown in the form of one or more key performance indicators (KPI) at each point in time. In the following, the case of a single KPI is considered as an example. In particular, the KPI can be defined for each of the points in time as the OEE (i.e., 〈OEE〉) averaged over a subsequent observation time period (for example subsequent x hours of the system operation). Production data PD (or 125) are used as further input data, which also relate to the observation time period for the KPI and in particular specify the products manufactured using the process 140 on the system 135 during this time period. Thus, both the values of the input data SD, HPD, and PD and the at least one corresponding value curve of the output data of the ML model, i.e., the metric KPI to be optimized, are available for training the ML model. In FIG. 7(*a*), a decision tree-based ML model is used as an example, wherein a specific model 710 is defined as the ML model to be used subsequently by means of the training from a large number of possible configurations 705 of the model.

Reference is now made again to FIG. 5, where the training step 525 is followed by a validation step 530 in which the already trained ML model is validated by means of the validation data VD determined in step 520. For this purpose, predictions for the output data for the output data, i.e., KPI (e.g. 〈OEE〉), are made by means of the trained ML model 710 based on historical actual values of the input data taken from the validation data VD and compared to the associated historically determined KPI also contained in the validation data to check the quality of the trained model 710. This is illustrated in FIG. 7(*b*).

If the trained ML model 710 does not pass the validation (535—no) due to a prediction that is not sufficiently good according to a defined validation criteria, the sequence branches in a step 535 back to step 520 in order to further train the ML model using additional training data TD for the purpose of its improvement.

Otherwise (535—yes), the operative use of the now trained and validated ML model 710 can begin. For this purpose, new input data ND are used, which have status data and process configuration data that come from an acquisition time period, in particular a continuously sliding acquisition time period $w_g$, during the execution of the process 140. Initially, the new data can also be taken from the validation data VD. In the recording time period, a sequence of time segments is considered, within which the process configuration (for example historical centerline) remained constant in each case. On the basis of the associated input data, the value of at least one selected KPI is now predicted for each of the time segments, for example the value ⟨OEE⟩ averaged over a prediction time period $w_P$ (for example y hours long) following the respective time segment or the corresponding average value ⟨DT⟩ of a system or process downtime DT.

In method 500, in a further step 545, its maximum, in particular its absolute maximum, is now determined from this chronological progression of the value of the KPI in the prediction time period. In a further step 550, the maximum found is used to infer the searched set PP1 of preliminary target process configuration parameters by selecting that set of process configuration parameters from the sequence of process configurations that occurred during the detection period that applied at the point in time in the detection period assigned to this maximum. In FIG. 7(c), this corresponds to the set PP1 of process configuration parameters associated with the absolute maximum of the KPI ⟨OEE⟩ marked with an asterisk.

In the case of multiple KPIs, the method 500 can be generalized to the effect that, in order to determine the maximum, the chronological progression of a specific function is considered, which has the KPIs as arguments.

The further ML-based method 600 illustrated in FIG. 6 represents a refinement of the method 500, which also relates to finding an optimal process configuration when a set of several KPIs is present. Method steps 605-640 of the method 600 correspond to method steps 505-540 of the method 500, wherein step 540 now considers multiple KPIs instead of one.

In contrast to method 500, in a further step 645, if present, multiple maxima in the chronological progression are determined for a value of a control KPI averaged over the respective prediction time period, which can in particular be the average OEE. If only one maximum occurs in the chronological progression, only this is determined.

Then, in step 650, that one of the maxima is selected whose associated prediction time period $W_P$ has the best average value for a determined function (metric) of the set of KPIs in terms of the optimization goal. In step 655, the set of process configuration parameters that applied during the detection period $W_g$ assigned to this maximum is now selected as the set PP2 of preliminary target process configuration parameters resulting from the calculation method 600.

In FIG. 7(c), this is illustrated with respect to two KPI, specifically one the one hand the average ⟨OEE⟩ and on the other hand the average downtime ⟨DT⟩ of the process 140 or system 135. The absolute maximum of the average ⟨OEE⟩ here is in the prediction time period $W_P = W_3$, but when the optimum is also determined involving the second KPI ⟨DT⟩, then it is present in the area marked with a diamond in the prediction period $W_P = W_2$, since there the average downtime ⟨DT⟩ is less than in the prediction time period $W_3$, while the value of ⟨OEE⟩ is only slightly lower. Consequently, the set PP2 of process configuration parameters, which originates from the acquisition time period $W_g$ corresponding to the prediction time period $W_2$, is selected here as the set of preliminary target process configuration parameters resulting from the method 600.

While two different ML-based calculation methods were presented above with reference to FIGS. 5 to 7, there are also other possibilities for using different ML-based calculation methods. In particular, they can be based on different ML models, which can differ in particular in their model type (for example neural network or decision tree-based), their hyperparameters, or the training data used for their training.

In order to achieve ongoing process optimization, the ML models can also always be trained further iteratively, for which purpose in particular the actual values for the input data and corresponding resulting KPIs that are obtained repeatedly, in particular continuously, during the execution of the process 140 can be used.

Figure 8:
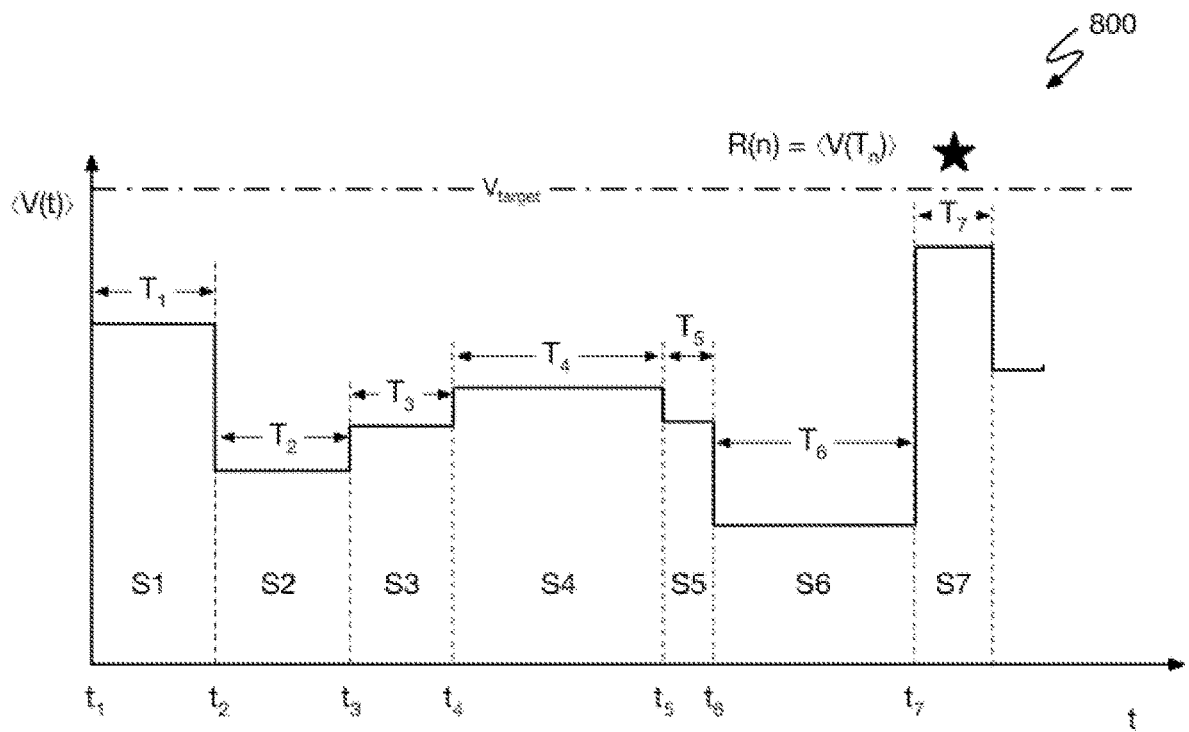
FIG. 8 shows a schematic illustration of a second non-ML calculation method, according to some embodiments of the invention.
Figure 9:
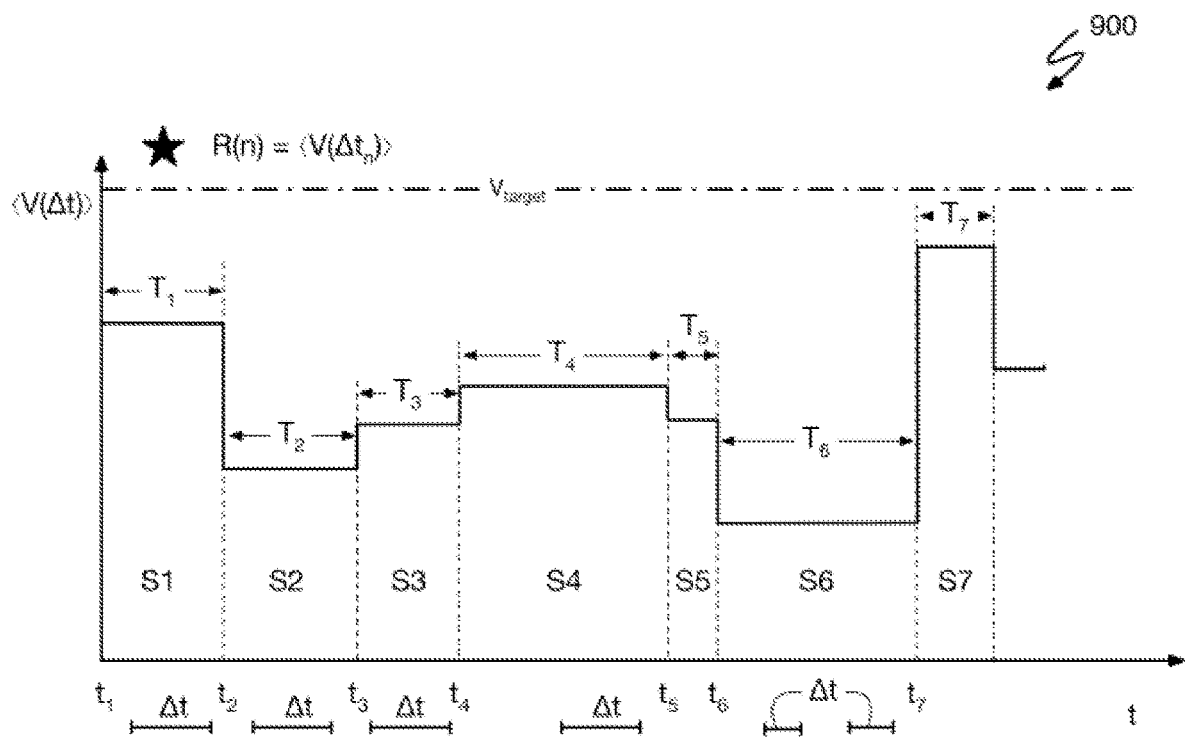
FIG. 9 shows a schematic illustration of a second non-ML calculation method, according to some embodiments of the invention.
Figure 10:
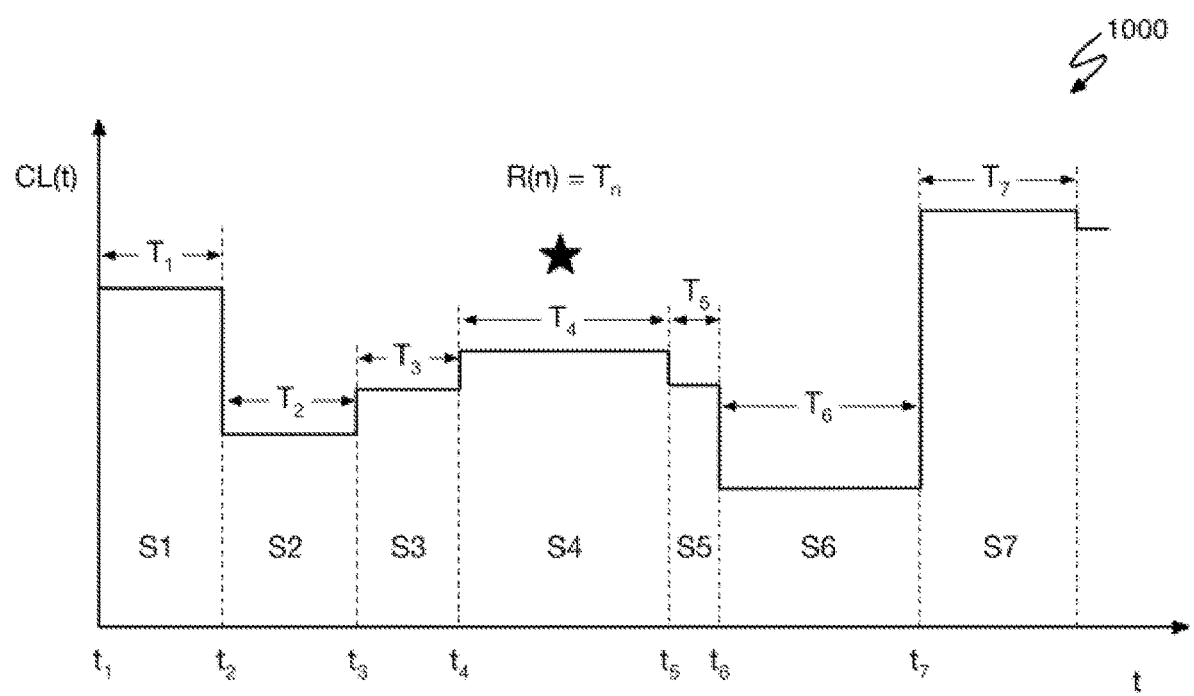
FIG. 10 shows a schematic illustration of a third non-ML calculation method, according to some embodiments of the invention.

With reference to FIGS. 8 to 10, three different, exemplary, non-ML-based calculation methods 800, 900, and 1000, which can be used in the scope of the method 300 in addition to one or more ML-based calculation methods 500 or 600, are now explained.

The calculation method 800 is illustrated in FIG. 8. In this case, the historical chronological progression represented in the input data of a measured variable occurring during execution of the process 140 and dependent on its course and directly or indirectly influencing the metric (for example OEE) is considered. The course of the measured variable is segmented in such a way, i.e., divided into (here for example seven) different time segments (segments) S1 to S7, that each segment defines a time segment of this chronological progression within which the value of the measured variable remains within a predetermined limited tolerance range around the starting value or mean value of the measured variable in the time segment (for example start value+/−x %). A segment change to another segment, on the other hand, occurs when the value leaves this limited tolerance range. The length of the tolerance range can be set to zero or not used at all, particularly in the event that the measured variable can only assume discrete values.

In FIG. 8, the average value ⟨V(t)⟩ of a product throughput rate V(t) of the process 140 averaged over the respective segment is used as a measured variable, for example. Due to the above-mentioned segment definition, the product throughput rate V(t) is essentially constant within each of the segments S1 to S7 and thus also corresponds to the average value ⟨V(t)⟩ or at least possibly lies within the tolerance range around the average value ⟨V(t)⟩. The segments S1 to S7 can have different durations $T_n$ from one another, with n=1, 2, ... 7. At the points in time $t_n$ corresponding to the starting points in time of the respective segments, segment changes occur due to corresponding sufficiently large changes in the product throughput rate V(t). A desired maximum product throughput rate is designated here by $V_{target}$.

In the scope of the method 800, the set PP3 of the associated preliminary target process configuration parameters to be determined is now determined as follows: The associated average value ⟨V(t)⟩ within the duration $T_n$ of the segment n is defined as the optimization variable R(n). The segment whose value R(n) is optimal, here in particular maximal, is then determined from the set of segments S1 to S7. In the present example of FIG. 8, this is the segment S7 marked with an asterisk having the duration $T_7$. The searched set PP3 of the preliminary target process configuration parameters from the method 800 is now determined as the set of those actual process configuration parameters, according to which the process was just configured during the time period $T_7$ or at the point in time $t_7$.

As an alternative to using the product throughput rate V(t) as a measured variable and thus to define the segments, the process configuration, i.e., the set of process configuration parameters that are typically variable over time during process execution, can itself be used as a measured variable, in particular in methods 800 and 900. The set of process configuration parameters thus remains constant within a segment, while a segment change occurs when at least one of the process configuration parameters changes or when there is a change out of a possibly defined tolerance range.

A second exemplary non-ML-based calculation method 900 is illustrated in FIG. 9. It is different from the calculation method 800, in particular in that the optimization variable R(n) is now defined so that instead of the respective average value $\langle V(t) \rangle_n$ determined over the segment duration $T_n$, the value of R(n) for that segment $S_n$ is maximal for which the average value $\langle V(\Delta t) \rangle_n$ of the throughput rate determined within the segment over a predetermined cumulative time period $\Delta t$ of a certain duration (for example 60 minutes) is maximum in a cross-comparison among all segments. Within a segment, the cumulative period of time $\Delta t$ can also consist of multiple time periods that are separated in time, as shown in FIG. 9 for the segment S6.

In the method 900, it can occur in particular that the duration of a segment is shorter than the time period $\Delta t$, so that such short segments are excluded from the optimization. In FIG. 9, for example, the segment S7 with n=7 does have the highest value for the optimization variable R(n), but since it is shorter than the time period $\Delta t$, it is not taken into consideration in the optimization, so that instead the segment S1 marked with an asterisk is selected as the optimal segment and thus its set of the associated process configuration parameter is defined as a set PP4 of the target process configuration parameters to be determined.

A third exemplary non-ML-based calculation method 1000 is illustrated in FIG. 10. It differs from the calculation methods 800 and 900 in particular in that the segments are defined in such a way that (i) the set of process configuration parameters remains constant within a segment (or within a tolerance range), while a segment change occurs if there is a change of at least one of the process configuration parameters or if there is a change out of a possibly defined tolerance range. Thus, the duration $T_n$ of a segment is determined by how long the same set of process configuration parameters was present within the considered value curve of the process configuration parameters (historical centerline CL(t)) (possibly within the tolerance range).

This segment duration $T_n$ is used here as the optimization variable R(n). That segment whose segment duration $T_n$ is maximal is thus selected as the optimum segment. The method 1000 can be generalized such that the segment duration within the acquisition time period for the input data is cumulatively defined as the sum of the individual segment lengths of those different segments within the acquisition time period that have the same set of process configuration parameters (possibly within the tolerance range) as one another. This set is then defined as the set PP5 of the target process configuration parameters to be determined in the scope of the method 1000.

While at least one exemplary embodiment has been described above, it should be appreciated that a large number of variations thereto existed. It should also be noted that the exemplary embodiments described only represent non-limiting examples, and are not intended to limit the scope, the applicability, or the configuration of the devices and methods described herein. Rather, the preceding description will provide a person skilled in the art with guidance for implementing at least one exemplary embodiment, while understanding that various changes in the functionality and arrangement of elements described in an exemplary embodiment may be made without departing from the scope of the subject matter specified in each of the appended claims and its legal equivalents.

LIST OF REFERENCE NUMBERS 100 overview illustration of technical system and optimization process
105 optimization process
110 plant control device
115, HPD historical process configuration data
120, SD status data
125, PD production data
130, CL (set of) target process configuration parameter(s), centerline or center line
135 technical system 135
140 process for manufacturing or processing products
145a-c conveyor devices
150 first processing station, for example for mechanical processing
155 second processing station, for example for thermal processing
160 third processing station, for example for chemical processing
165a-c sensors for position, orientation, status or other property of the starting materials/products A, intermediate products ZP1, ZP2, or final products P
170a-c sensors for statuses, in particular machine statuses, of the processing stations or other parts of the system 135
175 cloud
200 set of status parameters
205 various discrete configuration options, i.e., parameter values of the system
210 center line or centerline
300 exemplary embodiment of the method for process optimization using an ensemble method
305-355 steps of method 300
400 table explaining an exemplary ensemble method for the method 300 from FIG. 3
500 first ML-based calculation method
505-550 steps of method 300
600 second ML-based calculation method
605-650 steps of method 600
700 Illustration explaining methods 500 and 600
800 first non-ML calculation method
900 second non-ML calculation method
1000 third non-ML calculation method
A starting materials or starting products
DT downtime
K number of identical parameter values for a process configuration parameter in a cross-comparison using different calculation methods
KPI key performance indicator
M number of process configuration parameters
N number of status parameters
n segment index
ND new (input) data OEE overall equipment effectiveness]
P products resulting from process 140, in particular final products
R(n) optimization variable for non-ML calculation methods
SP1, . . . , SP7 process configuration parameters (setpoints)
t time
$t_n$ starting time of segment n
$T_n$ duration of segment n
TD training data
V(t) throughput rate
VD validation data
ZP1 intermediate products after first processing station 150
ZP2 intermediate products after second processing station 155

What is claimed is:

1. A method for automatically determining an optimized process configuration executable by means of a technical system and a process for manufacturing or processing products, which is configurable by means of a number M>1 of different process configuration parameters, wherein the method comprises:
acquiring historical process configuration data which, for a plurality of different points in time or time periods during at least one execution of the process, represent an actual process configuration of the process used in each case on the basis of actual values of the process configuration parameters that define this respective process configuration;
acquiring status data which, for each of the points in time or time periods, each represent an associated respective actual operating status of the technical system by means of respective actual values of a number N>1 of different status parameters of the technical system, wherein the status data are acquired from a sensor associated with a station that is configured to process the products, and the status data are transmitted to a control device;
acquiring production data which represent at least one target property of the products resulting from the process that can be influenced by the process or at least one actual or target property of at least one starting material or starting product; determining a process configuration of the process that is optimized with regard to a defined metric and defined by respective target values of the process configuration parameters using an optimization method adapted to the process and based at least partially on machine learning, using input data which comprise the production data as well as features given by the historical process configuration data and the status data or features derived therefrom, wherein the optimization method comprises:
repeated calculation of the process configuration of the process that is optimized with respect to the metric and represented by means of a respective set of preliminary target process configuration parameters, wherein each calculation is carried out by means of a respective calculation method from an ensemble of multiple mutually alternative calculation methods and each using features from the input data, and wherein at least one of the calculation methods of the ensemble is adapted to the process using machine learning; and
establishing target process configuration parameters based on a selected set of the set of the sets of preliminary target process configuration parameters, wherein this selection is carried out so that the selected set best meets a predetermined evaluation criterion for the sets of all sets; and
outputting target process configuration data which represent the determined optimized process configuration by means of the target values of the process configuration parameters, wherein the target process configuration data is a set of preliminary target process configuration parameters that represents a centerline of the sets of preliminary target process configuration parameters, and the control device is configured to operate the station according to the set of preliminary target process configuration parameters.

2. The method as claimed in claim 1, wherein the input data are time-dependent and the method is repeatedly carried out during an execution of the process in order to dynamically determine and output target process configuration data on the basis of the input data.

3. The method as claimed in claim 1, wherein outputting the target process configuration data comprises at least one of the following steps:
providing the target process configuration data at a data interface of the technical system;
transferring the target process configuration data via a communication link to a remote data receiver;
outputting or causing an output of the target process configuration data in human-readable form at a human-machine interface.

4. The method as claimed in claim 1, wherein the metric is defined in such a way that it quantifies one of the following optimization goals for the process or a certain combination of two or more of these optimization goals:
reducing the process variability of the process;
reducing the product variability of the products resulting from carrying out the process;
increasing the efficiency and/or effectiveness of the process.

5. The method as claimed in claim 1, wherein the status parameters are selected in such a way that they individually or cumulatively represent one or more of the following actual operating statuses of the technical system for the at least one current or earlier point in time or time period:
throughput rate or quantity of the manufactured or processed products;
error rate, error quantity or error type of errors that occurred during the process;
the respective operating speed of at least one moving part of the technical system;
one or more throughput loss times or points in time or time periods at which or during which reduced performance or a standstill of the technical system occurred;
items of information or identifiers of reasons that resulted in reduced performance or in a standstill of the technical system;
points in time for the start or end of process operation;
data types or formats of the input data or output data.

6. The method as claimed in claim 1, wherein the production data are selected in such a way that they represent one or more of the following target properties of the products to be obtained from the process or at least one starting material or starting product:
kind, type, quality, or selected physical or chemical properties of the starting materials or starting products used;
form or type of provision of the starting materials or starting products used;

kind, type, quality, or selected physical or chemical target properties of the products to be obtained from the process; and form or type of provision of the products to be obtained from the process.

7. The method as claimed in claim 1, wherein the number M of the process configuration parameters and the number N of the status parameters are selected such that $N+M \geq 10$ applies.

8. The method as claimed in claim 1, wherein the evaluation criterion is defined depending on:

for which set of the preliminary target process configuration parameters the metric was best met; or for which number of the process configuration parameters of the set it is true that its respective value in a cross-comparison using a measure of similarity within the set of the respective values for this process configuration parameter occurs relatively most frequently from all sets of preliminary target process configuration parameters, wherein each set of process configuration parameters meets the evaluation criterion better the higher this number is for this set.

9. The method as claimed in claim 1, wherein at least one of the calculation methods of the ensemble is not a machine-learning-based calculation method.

10. The method as claimed in claim 9, wherein at least one of the calculation methods of the ensemble, which is not a machine-learning-based calculation method, comprises:

segmenting the chronological progression of a measurement variable that is dependent on the course of the process and directly or indirectly influences the metric and that occurs during execution of the process in such a way that each segment defines a time segment of this chronological progression, within which the value of the measurement variable remains within a predetermined limited tolerance range around a starting value or a mean value of the measured variable, and a segment change to another segment occurs when the value leaves this limited value range; and determining the preliminary target process configuration parameters of the set of preliminary target process configuration parameters associated with this calculation method such that the preliminary target process configuration parameters of the set are determined as a function of those actual process configuration parameters according to which the process was configured during that of the segments in which the value of the measured variable in the cross-comparison among all segments has optimized a defined optimization variable.

11. The method as claimed in claim 10, wherein the optimization variable is defined as or in dependence on one of the following variables:

average value of the metric during the respective segment;

average value of the measured variable during a defined continuous or cumulative time period in the respective segment of a defined duration T that is the same for all segments, wherein the respective time period within a segment is selected in such a way that it optimizes the measured variable within the segment in cross comparison among multiple possible time periods of the duration T within the segment; and segment duration.

12. The method as claimed in claim 1, wherein the optimization method has at least one calculation method that is adapted to the process and is based on machine learning, ML, in which an ML model is used that uses features from the input data as input and supplies a value for the metric as an output.

13. The method as claimed in claim 12, wherein at least one of the following variables or at least one variable dependent thereon is determined for at least one of the parameters provided by means of the input data as a process configuration parameter or status parameter for a defined time window sliding over time and used as a feature by the ML model:

the sliding average of the respective actual values of the parameter, the associated points in time or time periods which are within the time window;

an exponentially weighted sliding average of the respective actual values of the parameter, the assigned points in time or time periods which are within the time window, wherein the weighting is carried out using an exponential function such that the actual values at more recent points in time are weighted higher than the actual values at older points in time;

the sliding average of the standard deviation of the distribution of the actual value of the parameter the associated points in time or time periods which are within the time window;

the number of changes in the actual value of the parameter within the time window;

the maximum number of changes of the actual value of the parameter within the time window, based on a defined time span;

the cumulative absolute duration or relative duration in relation to the duration of the time window of those time periods during which, according to the actual values of the parameter, the process was stopped or the technical system failed or was at a standstill;

a numeric variable that corresponds to a value of the parameter and characterizes this value if this parameter itself characterizes a non-numerical variable.

14. The method as claimed in claim 1, wherein the method is used to optimize a variable parameterized process configuration of a technical system for manufacturing or processing products of at least one of the following product types:

products which comprise material made of paper, cardboard, or paperboard;

films;

food;

steel;

tobacco;

textiles;

pharmaceuticals.

15. The method as claimed in claim 1, furthermore comprising at least one of the following steps:

automatically setting the technical system using the output target process configuration data to configure the technical system to perform the process according to the optimized process configuration; and automatically controlling the technical system to execute the process according to the optimized process configuration defined by the output target process configuration data.

16. A plant control system that is configured to configure or control a process for the production or processing of products that can be executed on the technical system according to the method as claimed in claim 1 according to the optimized process configuration.

17. A non-transitory computer-readable medium storing a computer program comprising instructions which cause a plant control system that is configured to configure or control a process for the production or processing of products that can be executed on the technical system according to the method as claimed in claim 1 according to the optimized process configuration.

* * * * *